United States Patent [19]

Hoffeins

[11] 4,043,120

[45] Aug. 23, 1977

[54] STARTING ARRANGEMENT FOR COMBINED AIR AND GAS TURBINE POWER PLANT

[75] Inventor: Hans Hoffeins, Viernheim, Germany

[73] Assignee: Brown Boveri-Sulzer Turbomaschinen AG, Zurich, Switzerland

[21] Appl. No.: 690,899

[22] Filed: May 28, 1976

Related U.S. Application Data

[63] Continuation of Ser. No. 514,102, Oct. 11, 1974, abandoned.

[30] Foreign Application Priority Data

Oct. 25, 1973 Germany .............................. 2353493

[51] Int. Cl.² ............................ F02C 7/26; F02C 3/18
[52] U.S. Cl. ............................... 60/39.14; 60/39.18 C; 60/39.51 R
[58] Field of Search ................ 60/39.14, 39.15, 39.17, 60/39.18 C, 39.18 R, 39.02, 39.33, 682, 683, 684, 715, 39.51 R, 39.16 R

[56] References Cited

U.S. PATENT DOCUMENTS 2,467,167  4/1949  Traupel .......................... 60/39.18 C
2,651,911  9/1953  Sterland .............................. 60/39.15
3,869,857  3/1975  Margen ........................... 60/39.18 R Primary Examiner—Carlton R. Croyle
Assistant Examiner—L. J. Casaregola
Attorney, Agent, or Firm—Pierce, Scheffler & Parker

[57] ABSTRACT

A gas-turbine plant of the air-storage type comprises a multi-stage gas-turbine having high and low pressure sections, a flow medium heating device located between the high and low pressure sections of the gas-turbine, a dynamoelectric machine coupled to the gas-turbine, a compressor also coupled to the dynamoelectric machine and an air-storage tank connected between the compressor outlet and the inlet to a heat exchanger heated by exhaust gas from the gas-turbine and through which the medium flows to the high pressure section of the gas-turbine. Two control valves are located in the outlet piping for the flow medium from the heat exchanger which are set to permit the high pressure section of the gas-turbine to be by-passed and the flow medium delivered directly to the heating device during starting of the gas-turbine whereas after the heat exchanger has been heated to between 50 and 100% of its mean operating temperature, the control valves are re-set so as to again permit all of the flow medium to be delivered to the high pressure stage of the gas-turbine.

1 Claim, 1 Drawing Figure

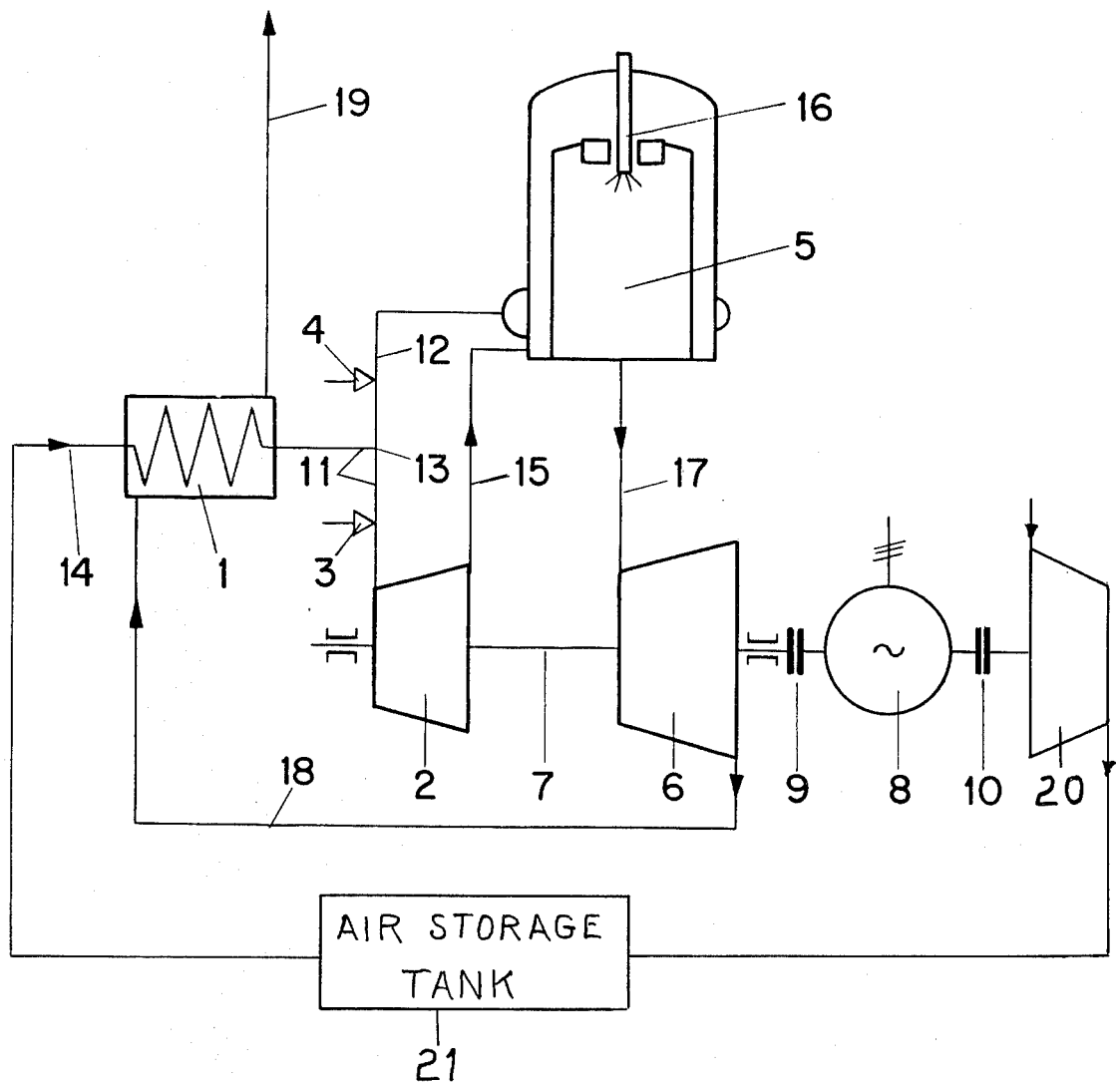

STARTING ARRANGEMENT FOR COMBINED AIR AND GAS TURBINE POWER PLANT

This is a continuation of application Ser. No. 514,102 filed Oct. 11, 1974, now abandoned.

The invention concerns a gas-turbine plant with a heat exchanger connected ahead of the turbine to heat the flow medium, and with a heating device for the medium after at least the first turbine stage.

If, in a plant of this kind, the heat exchanger has thoroughly cooled, as is the case when the plant has been shut down for any length of time, the flow medium, which on expanding in the first turbine stage (s) through which it passes undergoes a further temperature drop, is cooled to such as extent, depending on the turbine inlet temperature, that temperatures below zero ° (C) can occur. As a result, these turbine stages are themselves sharply cooled, and in addition, owing to this large temperature difference correspondingly severe thermal stresses occur in the subsequent heating device in which the flow medium is greatly heated. To keep these stresses within acceptable limits the loading rate on starting the gas turbine must be kept low. This gives rise to reduced throughout which, in the case of exhaust-gas heat exchangers, has the effect of prolonging the warm-up time and the starting process.

There exists the possibility of warming up the heat exchanger direct with an additional heating device for the purpose of starting, but even this would not significantly shorten the starting time. The higher fuel costs and especially the additional cost of construction required would be further disadvantages.

A long starting time is particularly undesirable in the case of air-storage gas-turbine plants, as these are operated as peak-load installations and are intended to provide high output as fast as possible.

The object of the invention is to create a gas-trubine plant of the kind stated above which, while avoiding the disadvantages inherent in known installations of a comparable nature, can be started quickly, and with which this aim can be achieved with a minimum of construction costs.

This objective is achieved in that a branch pipe is provided which leads to the heating device from a branch point located in a pipe joining the heat exchanger to the first turbine stage and incorporates a shutoff valve, and in that a shut-off valve is provided in the section of the pipe between the branch point and the first turbine stage.

The principles of the invention are particularly applicable to air-storage gas-turbine plants, and it is therefore proposed that the gas-turbine arrangement of the invention should constitute part of such a plant.

When operating the gas-turbine plant in accordance with the invention, the procedure is such that on starting the gas-turbine the flow medium is made to bypass the first turbine stage by closing the valve in the section of pipe between the branch point on this connecting pipe and the first turbine stage, and opening the valve in the branch pipe leading from the branch point to the heating device, the medium thus passing first to the subsequent turbine stages via the heating device. When the heat exchanger connected ahead of the first turbine stage has been sufficiently heated, preferably to between 50 and 100% of its mean operating temperature in °C, the above second mentioned valve is closed in accordance with a prescribed schedule, and the first-mentioned valve is opened.

By means of the procedure described, the flow medium undergoes no significant temperature drop even at the beginning of the starting process, and enters the heating device, in which the flow medium is heated before passing into the following turbine stages, at a temperature which is not so low as to give rise to unacceptable thermal stresses. The speed of loading on start-up can therefore be relatively high. The advantage thus lies principally in the fact that the plant can produce high outputs after a short starting time. During the starting phase, during which at least the first turbine stage is by-passed by the flow medium, only the power contributed by this stage is not available, but this is of little importance as compared with the other advantages. The fact that throughput can be high even during starting means that the exhaust-gas heat exchanger heats up quickly, which in turn also helps to keep the starting time for the plant comparatively short.

A preferred, and exemplary embodiment of the invention as applied to a gas-turbine plant having an air-storage tank is shown schematically in the accompanying drawing and will be described in more detail below.

The drawing shows the basic components of an air-storage gas-turbine plant. Here, 2 denotes the high-pressure section and 6 the low-pressure section of the gas-turbine, these being mounted on a common shaft 7. During a charging operation a synchronous dynamo-electric machine 8 functions as a motor and drives a compressor 20 by way of a coupling 10, which charges an air-storage tank 21. In peak-load operation, the machine 8 functions as a generator and is driven by the gas-turbine, by way of a coupling 9, the gas-turbine then drawing its air requirement from the air-storage tank 21. Couplings 9 and 10 are so designed that they allow the various machines to be connected and disconnected for the operating modes stated.

The flow medium (air, for example) coming from the storage tank 21 enters the heat exchanger 1 at 14, flowing in the direction of the arrow. The temperature of the medium to be heated is comparatively low, preferably below 100° C. In the normal operating mode, the heated flow medium leaving the heat exchanger 1 passes through pipe 11 into the inlet end of high-pressure section 2 of the gas-turbine, and thence from the outlet end thereof via pipe 15 to the heating device 5, which in the present case is in the form of a combustion chamber. Fuel is introduced into the combustion chamber at 16.

Having been heated in the combustion chamber, the flow medium passes via pipe 17 into the inlet end of the low-pressure section 6 of the gas-turbine, and thence from the outlet end thereof through pipe 18 to the exhaust-gas heat exchanger 1, where it heats up the medium coming from the storage tank 21 and entering the heat exchanger 1 at 14. The cooled flow medium then passes to the stack via pipe 19. At junction point 13 a connecting pipe 12 branches off pipe 11, this pipe 12 leading directly to the heating device 5 and incorporating a shut-off valve 4. The section of pipe 11 between junction point 13 and the inlet to high-pressure section 2 of the gas-turbine also contains a shut-off valve 3. In the normal turbine operating mode, valve 3 is open and valve 4 closed.

On starting the gas-turbine of the plant, however, the high-pressure section 2 of the gas-turbine is by-passed by closing valve 3 and opening valve 4, so that the flow medium is led directly to the low-pressure section 6 of the gas-turbine by way of the heating device 5. As soon as heat exchanger 1 has reached a sufficiently high temperature, valve 4 is closed in accordance with a prescribed schedule, and at the same time valve 3 is opened. This procedure accomplishes the transition to the normal operating mode which, as described above, ensues with flow admission to the high and low-pressure sections of the gas-turbine so as to drive the synchronous machine 8 which functions as a generator.

The invention is not limited to the example described. Various modifications are conceivable regarding construction and flow configuration. Thus, the invention is applicable to a gas-turbine plant which operates without connection to an air-storage container, in which case the flow medium passes directly from the compressor 20 coupled at 10, via pipe 14 to the heat exchanger 1.

The invention can also be applied to a gas-turbined plant of the closed-circuit type, in which the heating device comprises a separately heated heat exchanger (instead of the combustion chamber of the example) located between the high-pressure section and the low-pressure section. In this case, flow medium coming from the compressor is heated in the heat exchanger situated ahead of the first turbine stages by flow medium leaving the low-pressure section of the turbine, and during the starting process the medium by-passes the high-pressure section of the turbine and is fed directly to the separately heated heating device, from whence it flows to the low-pressure section of the turbine, while the flow medium coming from the low-pressure section of the turbine, having given up part of its remaining heat in the above-mentioned heat exchanger (which functionally is equivalent to the heat exchanger 1 in the drawing), undergoes further cooling and then returns to the compressor, thus completing the circuit.

The structural arrangement of the gas-turbine plant of the invention can also assume a variety of forms. The layout can be such that on starting, only the first turbine stage, or also in addition to the first stage a number of succeeding stages, is by-passed by the flow medium. Depending on the particular circumstances, it would also be possible to connect two or more heat exchangers ahead of the first turbine stage, and if necessary also provide more than one heating device.

Finally, it would also be possible to modify the example shown in the drawing in such a way that the heat exchanger 1 is not heated by exhaust gas from the gas-turbine, but by the flow medium after this has passed through the heating device 5.

Also, the location of the heat exchanger 1 along the flow path of the medium to be heated is not restricted to the position ahead of valve 3. It could, for example, be situated between valve 3 and the high-pressure section 2.

I claim:

1. A gas turbine plant of the air storage type for generating electrical power to satisfy peak load demand comprising: high and low pressure stage turbines arranged on a common shaft; a compressed air storage tank, a compressor for supplying said storage tank with compressed air, a dynamo-electric machine selectively operable as a motor receiving power for driving said compressor and as a generator driven by said turbines for delivering power to satisfy peak load demand, a heat exchanger located in the flow path of the compressed air from said storage tank for heating said compressed air in advance of its delivery to said turbines, said heat exchanger being supplied with exhaust heat from the outlet from said low pressure stage turbine, first pipe means including a first valve means therein for connecting the air outlet from said heat exchanger to the high pressure stage turbine, a heating device for the compressed air interposed in the air flow path between the outlet from said high pressure stage turbine and the inlet to said low pressure stage turbine, second pipe means including a second valve means therein for connecting the air outlet from said heat exchanger directly to the air inlet to said heating device, said first valve means being initially completely closed and said second valve means being initially completely open during a start-up of said plant whereby only said low pressure turbine stage is charged with compressed air flowing through the intially cold heat exchanger and said second valve means and thence through said heating device, and said first and second valve means being thereafter actuated to completely open and closed positions respectively after said heat exchanger has been heated to between 50 and 100% of its mean operating temperature whereby the compressed air now heated therein is passed through said first valve means and said high pressure turbine stage prior to delivery to said heating device for re-heating and delivery to said low pressure turbine stage.

* * * * *